United States Patent
Casses et al.

(10) Patent No.: US 9,425,521 B2
(45) Date of Patent: Aug. 23, 2016

(54) ELECTRICAL ASSEMBLY WITH ELECTRICAL CONNECTION DEVICE

(71) Applicants: DELPHI INTERNATIONAL OPERATIONS LUXEMBOURG S.A.R.L., Bascharage (LU); RENAULT S.A.S., Boulogne Ballancourt (FR)

(72) Inventors: Claude Casses, Clevilliers (FR); Marc Henri Giraud, Issy-les-Moulineaux (FR); Sebastien Lipetit, Voisins-le-Bretonneux (FR); Stephane Josse, Le Mesnil Saint Denis (FR)

(73) Assignees: DELPHI INTERNATIONAL OPERATIONS LUXEMBOURG S.A.R.L., Luxembourg (LU); RENAULT S.A.S. (FR)

( * ) Notice: Subject to any disclaimer, the term of this patent is extended or adjusted under 35 U.S.C. 154(b) by 0 days.

(21) Appl. No.: 14/652,939

(22) PCT Filed: Dec. 20, 2012

(86) PCT No.: PCT/IB2012/002924
§ 371 (c)(1),
(2) Date: Jun. 17, 2015

(87) PCT Pub. No.: WO2014/096887
PCT Pub. Date: Jun. 26, 2014

(65) Prior Publication Data
US 2015/0357732 A1    Dec. 10, 2015

(51) Int. Cl.
*H01R 4/28* (2006.01)
*H01R 11/28* (2006.01)
(Continued)

(52) U.S. Cl.
CPC ............ *H01R 11/288* (2013.01); *H01M 2/202* (2013.01); *H01R 13/111* (2013.01); *H01R 13/6315* (2013.01)

(58) Field of Classification Search
CPC ..................................... H01R 11/288
USPC ......................... 439/754, 669, 168, 668, 218
See application file for complete search history.

(56) References Cited

U.S. PATENT DOCUMENTS 6,595,804 B2 * 7/2003 Nagata ................... H01R 24/58
                                                         439/668
6,634,896 B1 * 10/2003 Potega ..................... G01K 1/02
                                                         374/E1.002

(Continued)

FOREIGN PATENT DOCUMENTS

WO    2011161023 A1    12/2011
WO    2012076983 A1    6/2012

OTHER PUBLICATIONS

International Search Report for International Application PCT/IB2012/002924, published Apr. 29, 2013.

*Primary Examiner* — Tulsidas C Patel
*Assistant Examiner* — Peter G Leigh
(74) *Attorney, Agent, or Firm* — Robert J Myers (57) ABSTRACT

The present invention relates to an electrical assembly comprising a first element having a first connection portion and a second element having a second connection portion, and an electrical connection device having an electrical member comprising a connection part with a first portion and a second portion. The electrical member of the electrical connection device is at least partly inserted in a first opening section of the first connection portion and a second opening section of the second connection portion along an inserting axis. The first portion of the connection part is in electrical connection with the first connection portion of the first element and the second portion of the connection part is in electrical connection with the second connection portion of the second element.

16 Claims, 6 Drawing Sheets

(51) Int. Cl.
  *H01R 13/11* (2006.01)
  *H01R 13/631* (2006.01)
  *H01M 2/20* (2006.01)

(56) References Cited

U.S. PATENT DOCUMENTS

| | | | |
|---|---|---|---|
| 6,945,803 B2* | 9/2005 | Potega | G01K 1/02 374/E1.002 |
| 7,316,588 B1* | 1/2008 | Rogers | H01R 23/26 439/668 |
| 7,322,858 B1* | 1/2008 | Rogers | H01R 24/58 439/668 |
| 7,407,416 B1* | 8/2008 | Rogers | H01R 24/58 439/669 |
| 7,727,029 B2* | 6/2010 | Bolin | G02B 6/3895 439/660 |
| 7,789,697 B2* | 9/2010 | Fiennes | H01R 13/7031 439/188 |
| 7,942,705 B2* | 5/2011 | Murphy | H01R 13/2421 439/668 |
| 8,180,397 B2* | 5/2012 | Stenmark | H04M 1/72527 455/557 |
| 2004/0009702 A1* | 1/2004 | Potega | H01R 24/58 439/578 |
| 2008/0188137 A1* | 8/2008 | Goetz | H01R 13/2428 439/669 |
| 2009/0075508 A1 | 3/2009 | Mitter et al. | |

* cited by examiner

ELECTRICAL ASSEMBLY WITH ELECTRICAL CONNECTION DEVICE

CROSS-REFERENCE TO RELATED APPLICATION

This application is a national stage application under 35 U.S.C. §371 of PCT Application Number PCT/IB2012/002924 having an international filing date of Dec. 20, 2012 which designated the United States, the entire disclosure of which is hereby incorporated herein by reference.

TECHNICAL FIELD OF THE INVENTION

The invention relates to electrical assemblies and to electrical connection devices for the electrical connection of at least two elements.

BACKGROUND OF THE INVENTION

International Patent Application Publication WO 2011/161023 describes an electrical connection device and, more precisely, a connecting bus comprising an electrically conductive bar and two female connectors. The connecting bus electrically interconnects two power terminals of respective power connectors. Each power terminals comprises a pin and the connecting bus is pushed on the pin up to an abutting position. Hence, the connecting bus achieves the electrical connection between power terminals.

However, in the abovementioned document, although the disclosed system is simple to mount, there is still a need to simplify connection assemblies, to secure their mounting by an operator, to ensure a suitable electrical contact and a suitable contact resistance with a reliable system.

There is further an increasing need to reduce cost of electrical assemblies and to provide a system which can adjust and/or eliminate backlash between two elements connected to each other.

BRIEF SUMMARY OF THE INVENTION

In accordance with an embodiment of the invention,

For this purpose, the present invention relates to an electrical assembly comprising
a first element having a first connection portion and a second element having a second connection portion, and
an electrical connection device having an electrical member comprising a connection part with a first portion and a second portion.

Moreover, the electrical member of the electrical connection device is at least partly inserted in a first opening section of the first connection portion and in a second opening section of the second connection portion along an inserting axis, the first portion of the connection part being in electrical connection with the first connection portion of the first element and the second portion of the connection part being in electrical connection with the second connection portion of the second element.

In some embodiments, one might also use one or more of the features as defined in the dependent claims.

The invention is also directed to an electrical connection device and to a method for electrically connecting two elements with an electrical connection device.

BRIEF DESCRIPTION OF THE SEVERAL VIEWS OF THE DRAWING

The present invention will now be described, by way of example with reference to the accompanying drawings, in which.

In different Figures, same reference numbers designate like or similar elements.

DETAILED DESCRIPTION OF THE INVENTION

Figure 1:
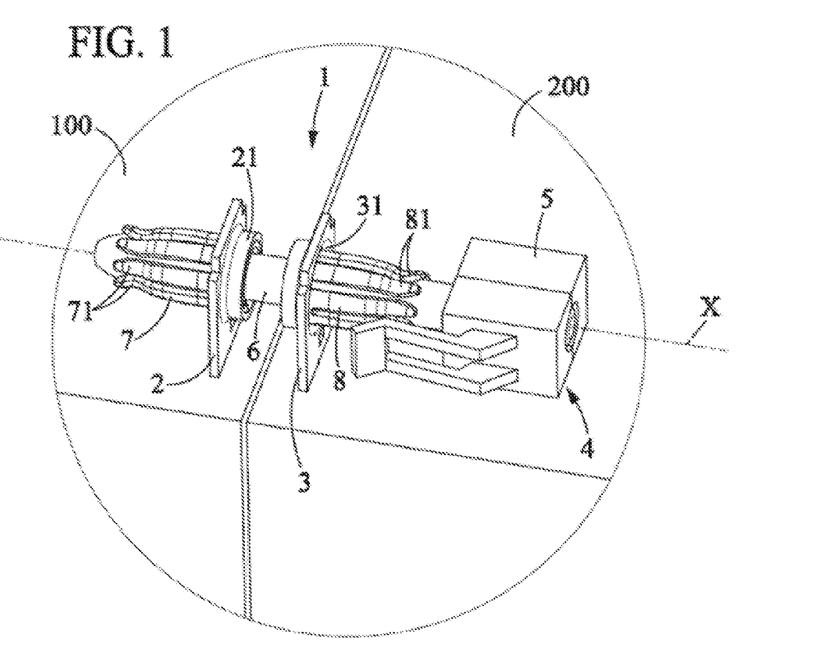
FIG. 1 is a perspective view of an electrical assembly in a connected state.
Figure 2:
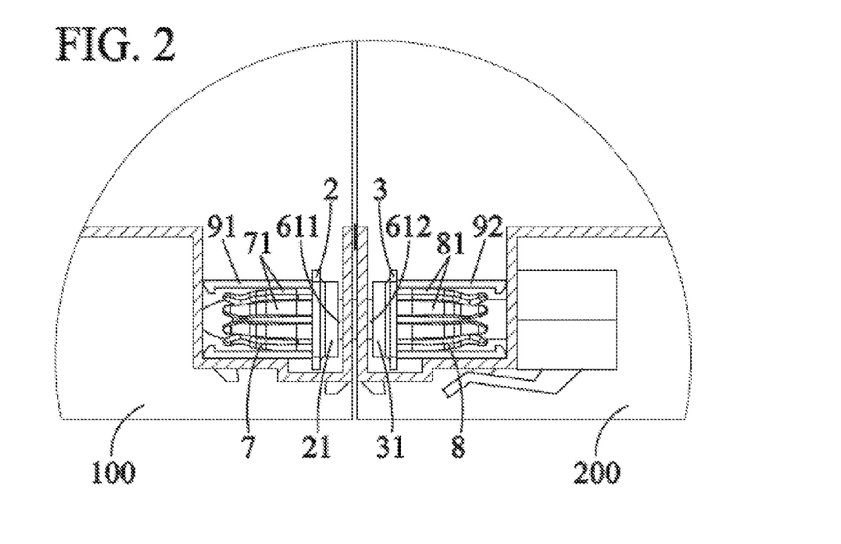
FIG. 2 is a top view of the electrical assembly of FIG. 1.

FIG. 1 is a perspective view of an electrical assembly 1 according to an embodiment of the present invention. Also, FIG. 2 is a top view showing this electrical assembly 1. As shown in FIGS. 1 and 2, the electrical assembly 1 comprises a first connection portion 2 and a second connection portion 3, which respectively belongs to a first element 100 and a second element 200. The first element 100 and the second element 200 are electrically connected through an electrical connection device 4 comprising an electrical member 6.

The electrical member 6 is at least partly inserted respectively in a first opening section 21 of the first connection portion 2 and a second opening section 31 of the second connection portion 3.

According to an embodiment of the invention, before the insertion of the electrical member 6 in the first opening sections 21 and in the second opening section 31, fastening elements 7, 8 are inserted in the first opening section 21 and/or in the second opening section 31 to fasten the electrical member 6 into the first opening section 21 and/or in the second opening section 31.

Fastening elements 7, 8 may also ensure a correct electrical connection between the electrical member 6 and the first connection portion 2 and the second connection portion 3.

As shown in FIG. 2, fastening elements 7, 8 may also comprise protective housings 91, 92. Such protective housings 91, 92 are also used as a centering system during the connection with the electrical member 6.

In an embodiment, fastening elements 7, 8 comprise a main body with a plurality of spring tongues 71, 81 extending from the main body around an inserting axis X and which retain the electrical member 6.

The first opening section 21 and the second opening section 31 are advantageously circular openings and fastening elements 7, 8 have advantageously an external general cylindrical shape, such as fastening elements 7, 8 may be resiliently held in the first opening section 21 and/or the second opening section 31. The plurality of spring tongues 71, 81 may, for example, extend axially from a circular shaped ring which is fitted into respectively the first opening section 21 and/or the second opening section 31.

The electrical member 6 comprises a connection part 61, advantageously a straight connection part 61, comprising a first portion 611 and/or a second portion 612. The first portion 611 and/or the second portion 612 of the connection part 61 of the electrical member 6 are respectively secured in the first opening section 21 and/or the second opening section 31 of the first element 100 and the second element 200 thanks to the elastic force due to the spring tongues 71, 81.

Figure 3:
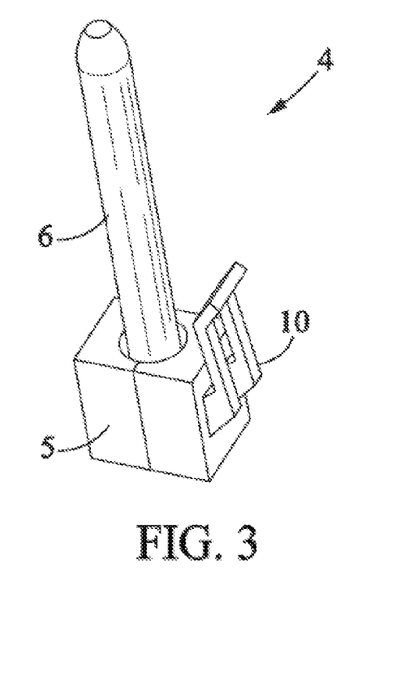
FIG. 3 is a perspective view of an electrical connection device of the electrical assembly of FIG. 1.

FIG. 3 shows more specifically the electrical connection device 4. The electrical connection device 4 comprises, further to the electrical member 6, a non-conductive housing 5. The non-conductive housing 5 is provided with a fastening system 10, which is advantageously releasable, to fasten the electrical connection device 4 to the first element 100 and/or to the second element 200. The fastening system 10 is preferably a clip 10. Alternatively, the fastening system 10 may be a fastening element 10 with gripping action effected solely by the inherent resistance to deformation of the material of the fastening element 10 which secures the connection device 4 to the first element 100 and/or to the second element 200.

The non-conductive housing 5 may, for example, have a substantially parallelepiped external shape with the fastening system 10 provided on one of an external face of the parallelepiped external shape.

To fasten the electrical connection device 4 to the first element 100 and/or to the second element 200 with the fastening system 10, the first element 100 and/or the second element 200 has an attachment portion. The attachment portion of the first element 100 and/or the second element 200 may be, for example, a cover housing 20, 30, which are depicted on FIG. 6d, fastened to the first element 100 and/or to the second element 200 or to a part of the first element 100 and/or of the second element 200 extending outwardly.

Thus, the connection device 4 is easily connectable. Moreover, the connection device 4 is easy to mount. In addition, the non-conductive housing 5 of the connection device 4 ensures the security of the operator during the connection step of the first element 100 and the second element 200.

A closure positioning assurance may be provided on the connection device 4 to ensure a correct clipping of the connection device 4 on the first element 100 and the second element 200.

Figure 4:
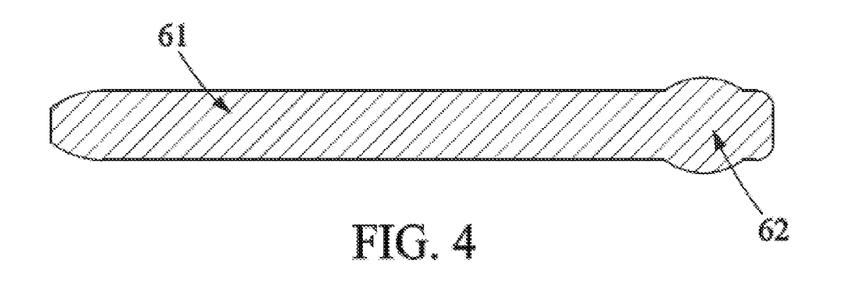
FIG. 4 is a longitudinal cut section view of the electrical member of the connection device of FIG. 3.

The electrical member 6 is shown on FIG. 4 and comprises the connection part 61 and an attachment portion 62. As previously described, the connection part 61 has the first portion 611 and/or the second portion 612, which are depicted on FIG. 2. The first portion 611 of the connection part 61 is in electrical connection with the first connection portion 2 of the first element 100. Alternatively or in addition, the second portion 612 of the connection part 61 is in electrical connection with the second connection portion 3 of the second element 200.

The electrical member 6 is made of a material which is electrically conductive. The material of the electrical member 6 is not limited as long as it is electrically conductive. For example, materials like copper alloy can be used.

In an embodiment of the invention, the electrical member 6 is a pin having the connection part 61 and the attachment portion 62. Advantageously, the connection part 61 has a general cylindrical shape. Moreover, preferably, the attachment portion 62 has a spherical element or a partly spherical element located at the end of the connection part 61.

According to a particular embodiment of the present invention, the electrical member 6 and the non-conductive housing 5 comprise an adjustable inclination system 56, adapted to allow rotation of the electrical member 6 with regard to the non-conductive housing 5. Particularly, the adjustable inclination system 56 allows a rotation of the electrical member 6 with regard to the non-conductive housing 5 of at least 1°. Preferably, the adjustable inclination system 56 allows an inclination of the electrical member 6 with regard to the non-conductive housing 5 up to 5°.

Additionally, the electrical member 6 and the non-conductive housing 5 are preferably secured to one another through the adjustable inclination system 56.

In an aspect of the present invention, the adjustable inclination system 56 is a spherical joint suitable to provide a free rotation of the electrical member 6. The spherical joint of the connection device 4 may allow a free rotation and inclination of the electrical member 6 with regard to the non-conductive housing 5 of at least 1° and preferably up to 5°. Such arrangement compensates the backlash between the electrical member 6 and the non-conductive housing 5.

The adjustable inclination system 56 can adjust and/or eliminate backlash while inserting the electrical element 6 into the first opening section 21 of the first connection portion 2 and/or the second opening section 31 of the second connection portion 3. Thus, the adjustable inclination system 56 allows the compensation of manufacturing and/or positioning tolerances of the first element 100 and of the second element 200. A perfect alignment of the first connection portion 2 and the second connection portion 3 is not necessary any more to enable a correct electrical connection of the first element 100 and the second element 200.

Figure 5:
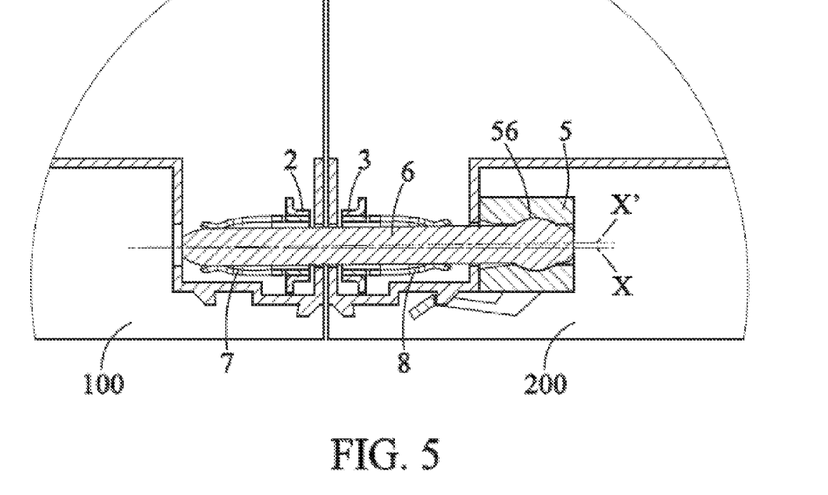
FIG. 5 is a top section view of an embodiment of the electrical assembly.

As illustrated in FIG. 5, the first element 100 and/or the second element 200 may be battery modules comprising bus bars provided with the first connection portion 2 and the second connection portion 3. Each bus bar may be internal bus bar located inside respectively the first battery module 100 and the second battery module 200. The electrical connection device 4 connects the first battery module 100 and the second battery module 200 together.

FIG. 5 shows a detail of the connection of the first battery module 100 and the second battery module 200 with the connection device 4. On FIG. 5, protective housings 91 and 92 are not shown, to make the representation easier.

As shown, the first opening section 21 and the second opening section 31 of the respective first battery module 100 and the second battery module 200 are not aligned, as shown with respective axis X and X'. The spherical joint of the connection device 4 compensate the "staggered" effect between the first opening section 21 and the second opening section 31 by allowing a free rotation and inclination of the electrical member 6 with regard to the housing 5. Thanks to the flexibility of the spring tongues 71, 81, a correct electrical connection is enabled.

FIGS. 6a to 6f show different steps to connect the first element 100 and the second element 200, which are adjacent, with the electrical connection device 4, according to the present invention.

Figure 6A:
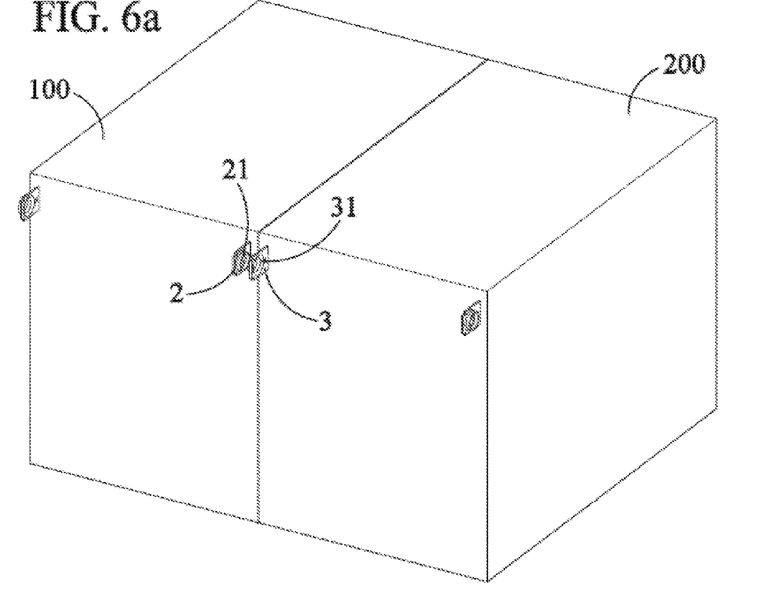
FIGS. 6a to 6f are perspective views of the different steps to electrically connect two adjacent elements according to the present invention.

In a first step, as illustrated in FIG. 6a, the first element 100 and the second element 200 are provided and arranged in an adjacent way. Respectively, the first element 100 and the second element 200 comprise each a respective connection portion, i.e. the first connection portion 2 and the second connection portion 3 provided respectively with the first opening section 21 and the second opening section 31, for example circular openings. Advantageously, the first connection portion 2 and the second connection portion 3 are arranged close one to the other.

Figure 6B:
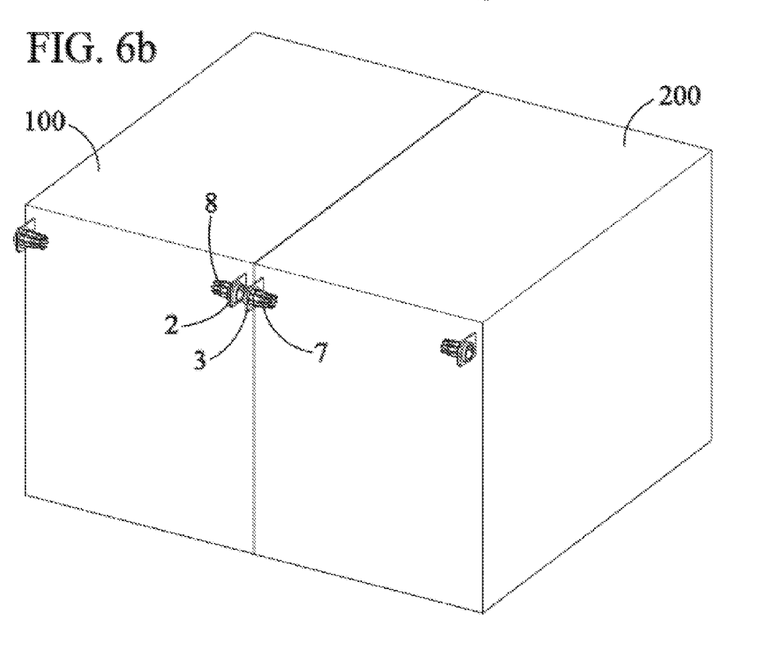

In a possible second step, as shown in FIG. 6b, fastening elements 7, 8 are provided and inserted in the first opening section 21 and/or the second opening section 31 of the first connection portion 2 and/or the second connection portion 3 along the inserting axis X. The fastening elements 7, 8 may have an external general cylindrical shape, such that fastening elements 7, 8 may be resiliently held in the first opening section 21 and/or in the second opening section 31. The plurality of spring tongues 71, 81 may, for example, extends axially, along the inserting axis X, from the first opening section 21 and/or the second opening section 31. Preferably, spring tongues 71, 81 extends axially, along the inserting axis X, from a circular shaped ring, which is fitted into the first opening section 21 and/or the second opening section 31.

Figure 6C:
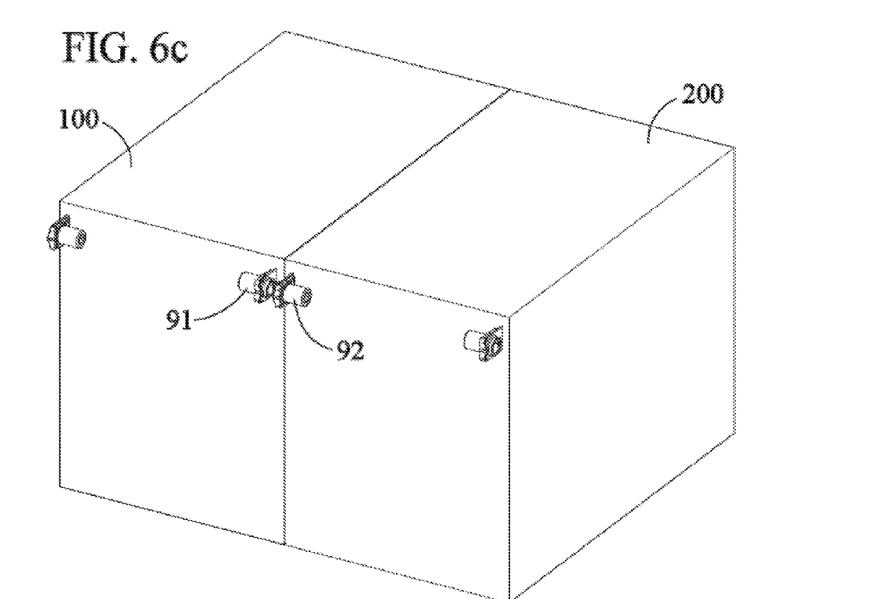

In a further possible third step, as shown in FIG. 6c, protective housings 91, 92 are provided over fastening elements 7, 8. Preferably, protective housings 91, 92 have a general hollow cylindrical shape and cover at least spring tongues 71, 81. Specifically, each protecting housing 91, 92 comprise a fastening system, for instance a clip, to fasten protective housing 91, 92 onto the first connection portion 2 of the first element 100 and/or the second connection portion 3 of the second element 200.

Thus, fastening elements 7, 8 with spring tongues 71, 81, and, potentially, protective housings 91, 92, are fastened to the first connection portion 2 and/or the second connection portion 3 and form with the first opening section 21 and/or the second opening section 31 a female connection part. The connection part 61 of the electrical member 6 forms a male connection part.

The protective housing 91, 92 is made of an electrically non-conductive material which is, for example, a plastic material. Spring tongues 71, 81 are made of an electrically conductive material.

Additionally, protective housings 91, 92 may allow realignment during the connection and may protect spring tongues 71, 81 before their fastening to the first opening section 21 and/or the second opening section 31, for example during the delivery of the electrical connection system comprising the electrical connection device 4 and the fastening elements 7, 8.

Figure 6D:
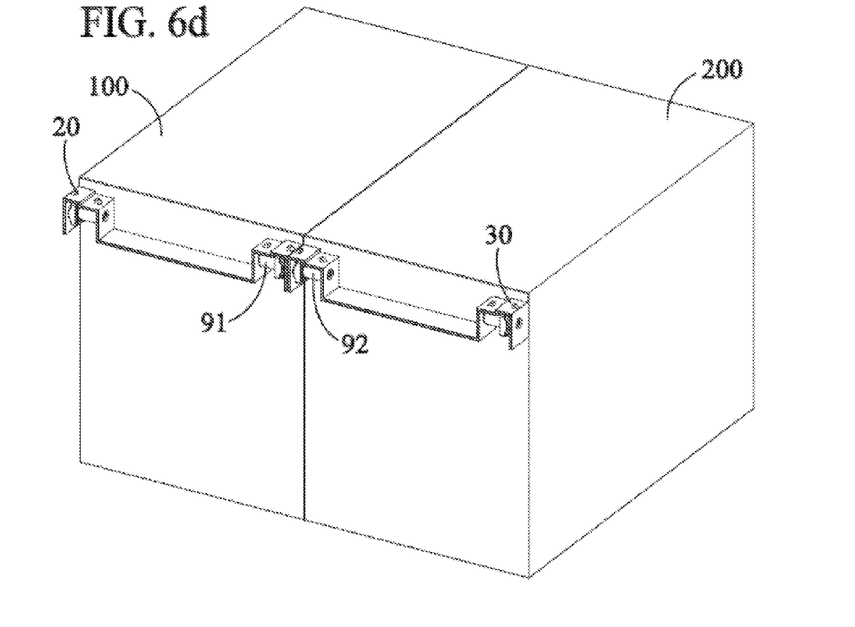

In an embodiment of the present invention, the first opening section 21, respectively the second opening section 31, extends outwardly from the first element 100, respectively from the second element 200, and the first cover housing 20, respectively the second cover housing 30, may be provided on the first element 100, respectively on the second element 200, to cover first connection portion 2, respectively the second connection portion 3, as depicted on FIG. 6d.

Figure 6E:
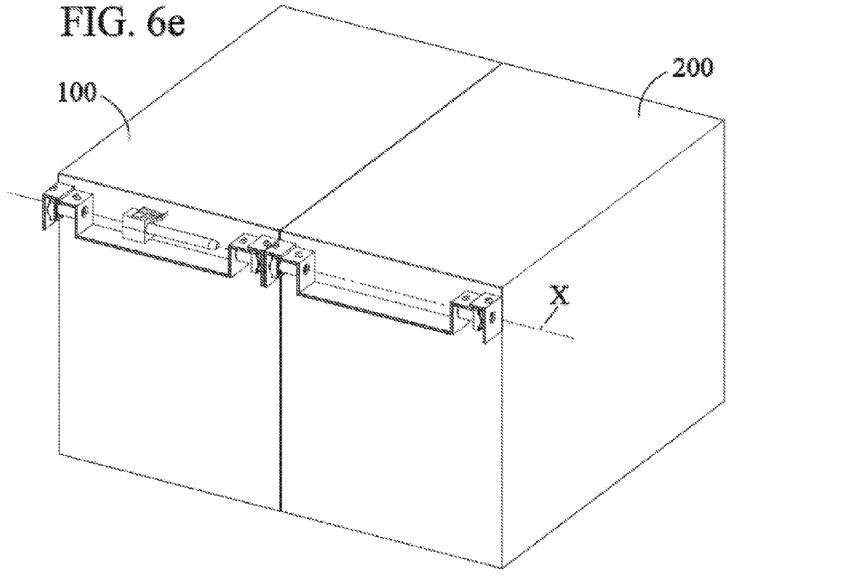

Referring to FIG. 6e, in a further step, the electrical connection device 4 comprising the electrical member 6 is further provided. The electrical member 6 is inserted, at least partly, respectively, in the first opening section 21 and/or in the second opening section 31 of the first connection portion 2 and the second connection portion 3 along an inserting axis X.

The electrical member 6 is inserted in the first opening section 21 and in the second opening section 31 until, on one hand, the first portion 611 of the connection part 61 is in electrical connection with the first connection portion 2 and, on the other, the second portion 612 of the connection part 61 is in electrical connection with the second connection portion 3. The electrical connection device 4 is then secured on the first element 100 and the second element 200 with the fastening system 10, such as the clip 10.

Figure 6F:
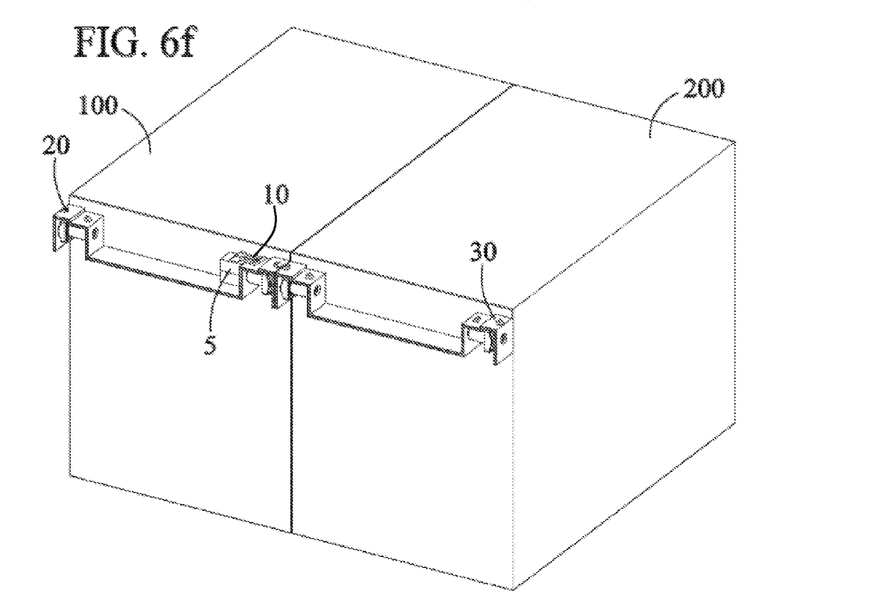

As shown in FIG. 6f, the fastening system 10 is directly attached on the cover housing 20, 30 of one of the first element 100 and/or the second element 200 and thus secures the connection device 4 to one of the first element 100 and/or the second element 200.

In another possible embodiment, the fastening system 10 may directly be attached to the first element 100 and/or to the second element 200, as long as the first element 100, respectively the second element 200, has an attachment portion suitable to engage the fastening system 10. The fastening system 10 can be inserted firstly either in the first opening section 21 or in the second opening section 31, and then secured either on the first element 100 and/or the second element 200.

The present invention provides thus an electrical assembly 1 simple to be mounted.

In an embodiment of the invention, the first element 100 and the second element 200 being battery modules, the dimensions of the electrical connection device 4 and fastening elements 7, 8 are such that they prevent an operator from being electrocuted. More precisely, the dimensions of the electrical connection device 4 and fastening elements 7, 8 are such that the level of protection for an operator of the present electrical assembly 1 reaches the IP2x protection level. The electrical assembly 1 offers a protection against direct contact for fingers or different objects. Moreover, a suitable electrical contact and a suitable contact resistance are ensured and the assembly is easily reliable.

In other embodiments of the present invention, the electrical assembly 1 is provided without intermediate elements such as fastening elements 7, 8. Therefore, the connection part 61 of the electrical member 6 is directly in contact with the first opening section 21 and in the second opening section 31. For such particular embodiment, the manufacturing tolerances of the connection part 61 of the electrical member 6, the first opening section 21 and the second opening section 31 have to be particularly precise to ensure the electrical contact.

In other possible embodiments of the invention, fastening elements 7, 8 may consist only in a conductive element.

The electrical assembly can be used to connect bus bars, as abovementioned, but also cables or other electrical devices.

The invention claimed is:

1. An electrical assembly, comprising:
   a first element having a first connection portion;
   a second element having a second connection portion; and
   an electrical connection device having an electrical member comprising a connection part with a first portion and a second portion, wherein the electrical member of the electrical connection device is at least partly inserted in a first opening section of the first connection portion and in a second opening section of the second connection portion along an inserting axis, wherein the first portion of the connection part is in electrical connection with the first connection portion of the first element and the second portion of the connection is in electrical connection with the second connection portion of the second element, wherein the electrical connection device further comprises a non-conductive housing and wherein the electrical connection device further comprises an adjustable inclination system configured to allow an inclination of the electrical member with regard to the non-conductive housing of 1° to 5°.

2. The electrical assembly according to claim 1, further comprising fastening elements inserted in at least one of the first opening section of the first connection portion and the second opening section of the second connection portion, wherein the electrical member is fastened into at least one of the first opening section and the second opening section by said fastening elements.

3. The electrical assembly according to claim 2, wherein the fastening elements comprise a main body with a plurality of spring tongues extending from the main body around the inserting axis.

4. The electrical assembly according to claim 1, wherein the electrical member further comprises an attachment portion for attachment to the non-conductive housing.

5. The electrical assembly according to claim 1, wherein the non-conductive housing of the electrical connection device is provided with a fastening system to fasten the electrical connection device to at least one of the first element and the second element.

6. The electrical assembly according to claim 1, wherein at least one of the first element and the second element is a battery module.

7. The electrical assembly according to claim 6, wherein said battery module comprises a bus bar provided with the first connection portion and the second connection portion respectively.

8. The electrical assembly according to claim 7, wherein the bus bar is internal bus bars located inside the battery module.

9. An electrical connection device, comprising:
the electrical assembly according to claim 1;
an electrical member having a connection part; and
an attachment portion for attachment to the non-conductive housing, wherein the non-conductive housing is secured to the electrical member.

10. The electrical connection device according to claim 9, wherein the electrical member is an electrically conductive pin.

11. The electrical connection device according to claim 9, wherein the connection part has at least one of a first portion and a second portion.

12. The electrical connection device according to claim 11, wherein the connection part has a generally cylindrical shape.

13. The electrical connection device-according to claim 11, wherein the attachment portion has a spherical element or a partly spherical element located at an end of the connection part.

14. The electrical connection device according to claim 9, wherein the adjustable inclination system is a spherical joint suitable to provide a free rotation of the electrical member.

15. A method for electrically connecting a first element and a second element which are adjacent to an electrical connection device, the method comprising the steps of:
providing the first element and the second element having a first connection portion and a second connection portion respectively;
providing the electrical connection device with:
a non-conductive housing,
an electrical member having a connection part and an attachment portion for attachment to the non-conductive housing, the connection part having a first portion and a second portion, and
an adjustable inclination system configured to allow an inclination of the electrical member with regard to the non-conductive housing of 1° to 5;
inserting, at least partly, the electrical member of the electrical connection device in a first opening section of the first connection portion and a second opening section of the second connection portion respectively along an inserting axis, wherein the first portion of the connection part is in electrical connection with the first connection portion and the second portion of the connection part is in electrical connection with the second connection portion; and
securing the electrical connection device to at least one of the first element and the second element by a releasable fastening system.

16. The method according to claim 15, further comprising the step of:
providing fastening elements, attached to first and second opening sections of the respective first and second connection portions along the inserting axis, wherein this step is performed prior to the step of providing an electrical connection device.

* * * * *